(12) United States Patent
May-Weymann et al.

(10) Patent No.: US 9,363,715 B2
(45) Date of Patent: Jun. 7, 2016

(54) MODEM AND METHOD FOR HANDING OVER IP MULTIMEDIA SUBSYSTEM SESSIONS FROM A PACKET-SWITCHED NETWORK TO A CIRCUIT-SWITCHED NETWORK

(71) Applicant: Nvidia Corporation, Santa Clara, CA (US)

(72) Inventors: Alexander May-Weymann, Sophia Antipolis (FR); Bruno De Smet, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 107 days.

(21) Appl. No.: 14/025,617

(22) Filed: Sep. 12, 2013

(65) Prior Publication Data
US 2015/0071247 A1    Mar. 12, 2015

(51) Int. Cl.
*H04W 36/00* (2009.01)

(52) U.S. Cl.
CPC ................. *H04W 36/0022* (2013.01)

(58) Field of Classification Search
CPC .................................. H04W 36/0022
See application file for complete search history.

(56) References Cited

U.S. PATENT DOCUMENTS

2013/0336127 A1* 12/2013 Wu .............. 370/241
2014/0219241 A1* 8/2014 Parron .......... 370/331

* cited by examiner

*Primary Examiner* — Pao Sinkantarakorn

(57) ABSTRACT

A modem and a method for handing over Internet protocol (IP) multimedia subsystem (IMS) sessions from a packet-switched network to a circuit-switched network. One embodiment of the modem includes: (1) a physical layer through which IMS packets for a plurality of IMS sessions are transmittable and receivable, and (2) a control layer configured to gain access to respective IMS session data for the plurality of IMS sessions, the respective IMS session data originating from a host IMS application.

24 Claims, 2 Drawing Sheets

MODEM AND METHOD FOR HANDING OVER IP MULTIMEDIA SUBSYSTEM SESSIONS FROM A PACKET-SWITCHED NETWORK TO A CIRCUIT-SWITCHED NETWORK

TECHNICAL FIELD

This application is directed, in general, to Internet protocol (IP) multimedia subsystem (IMS) sessions established by host IMS applications and, more specifically, to aligning IMS session data between the host IMS application and modem.

BACKGROUND

Early mobile communication devices used dedicated channels for voice communication. Voice communication, at that point in time, constituted the majority of all data transmitted and received through mobile devices. As mobile technology advanced, alternate forms of data were introduced to mobile devices, including text messages and emails, and eventually broadband web access. Dedicated voice channels persisted through most of this progression until broadband web access became the dominant consumer of bandwidth for mobile devices.

Many modern mobile communication devices, particularly cellphones, smartphones and tablet computers, are shifting to IMS based voice communication rather than dedicated voice channels. This shifting is driven by the ever expanding use of broadband web access to stream audio and video content. This expansion has made the volume of data required for voice communication an inconsequential portion of all data transmitted and received by a given device. Additionally, the amount of available bandwidth has dwarfed the demands of voice communication.

A voice-only or video/voice call can be carried out over an IMS session. An IMS session is an IP connection over which IMS packets are transmitted and received. The IMS packets are simply transmitted and received along with all other IP packets for the device. An enabling factor of the shift to IMS is the ability of networks to efficiently route IMS packets from a source to a destination. The efficiency of a network is largely driven by the latency introduced and the level of accuracy of transmissions. Other factors, such as power, contribute to the efficiency of a network, but the telecommunication industry often focuses on time and accuracy.

One development that has furthered IMS communication is the availability of packet-switched (PS) networks over alternate, circuit-switched (CS) networks. In a CS network, data is routed over a dedicated circuit from point-to-point. No other network traffic can use the dedicated circuit as long as the connection exists. In a PS network, each message is broken into packets that are routed point-to-point. Each packet seeks out the most efficient route to reach its destination. The message is then reassembled at the receiving end.

CS networks are most common in voice applications, where terminals are relatively limited and the volume of data is relatively low. Outside of that, when the volume of data becomes large and the access points grow exponentially, as in broadband web access, it becomes more efficient to use PS networks, where the network load can be better distributed.

Modern mobile networks provide network bandwidth primarily through PS networks, although wider coverage is available on some CS networks. Consequently, mobile devices tend to rely mostly on the PS networks for carrying out IMS sessions, and fall back on the CS networks as needed. It is often the case that an IMS session originates on a PS network, such as a long-term evolution (LTE) network, and a party's mobile communication device moves from an area with LTE coverage to an area without. In that case, the mobile communication device must hand over the IMS session from the PS network to a CS network, such as a second or third generation (2G/3G) network. PS network coverage being as limited as it is, the telecommunication industry contemplated the scenario and established procedures for carrying out the handover. These procedures are known as the single radio voice call continuity (SRVCC) procedure and the video SRVCC (vSRVCC) procedure. The SRVCC procedure is for handing over a voice IMS session, while the vSRVCC procedure is for handing over a video/voice IMS session. The SRVCC procedure and the vSRVCC procedure are established by the Third Generation Partnership Program (3GPP), which maintains the 3GPP standard that applies to most modern mobile communication networks and devices.

SUMMARY

One aspect provides a modem. In one embodiment, the modem includes: (1) a physical layer through which IMS packets for a plurality of IMS sessions are transmittable and receivable, and (2) a control layer configured to gain access to respective IMS session data for the plurality of IMS sessions, the respective IMS session data originating from a host IMS application.

Another aspect provides a method of handing over IMS sessions from a PS network to a CS network. In one embodiment, the method includes: (1) executing an IMS host application to establish the IMS sessions on the PS network and to collect respective IMS session data for the IMS sessions, (2) aligning the respective IMS session data between the IMS host application and a modem configured to carry out the IMS sessions, and (3) employing the respective IMS session data in handing over the IMS sessions to the CS network.

Yet another aspect provides a mobile communication device. In one embodiment, the device includes: (1) an application processor configured to execute an IMS host application operable to establish IMS sessions and maintain respective IMS session data for the IMS sessions, and (2) a modem configured to carry out the IMS sessions over a network and having: (2a) a physical layer through which IMS packets for the IMS sessions are transmittable and receivable, (2b) a mobility management (MM) layer configured to gain access to the respective IMS session data, and (2c) a call control (CC) layer configured to gain access to the respective IMS session data.

BRIEF DESCRIPTION

Reference is now made to the following descriptions taken in conjunction with the accompanying drawings, in which.

DETAILED DESCRIPTION

Figure 1:
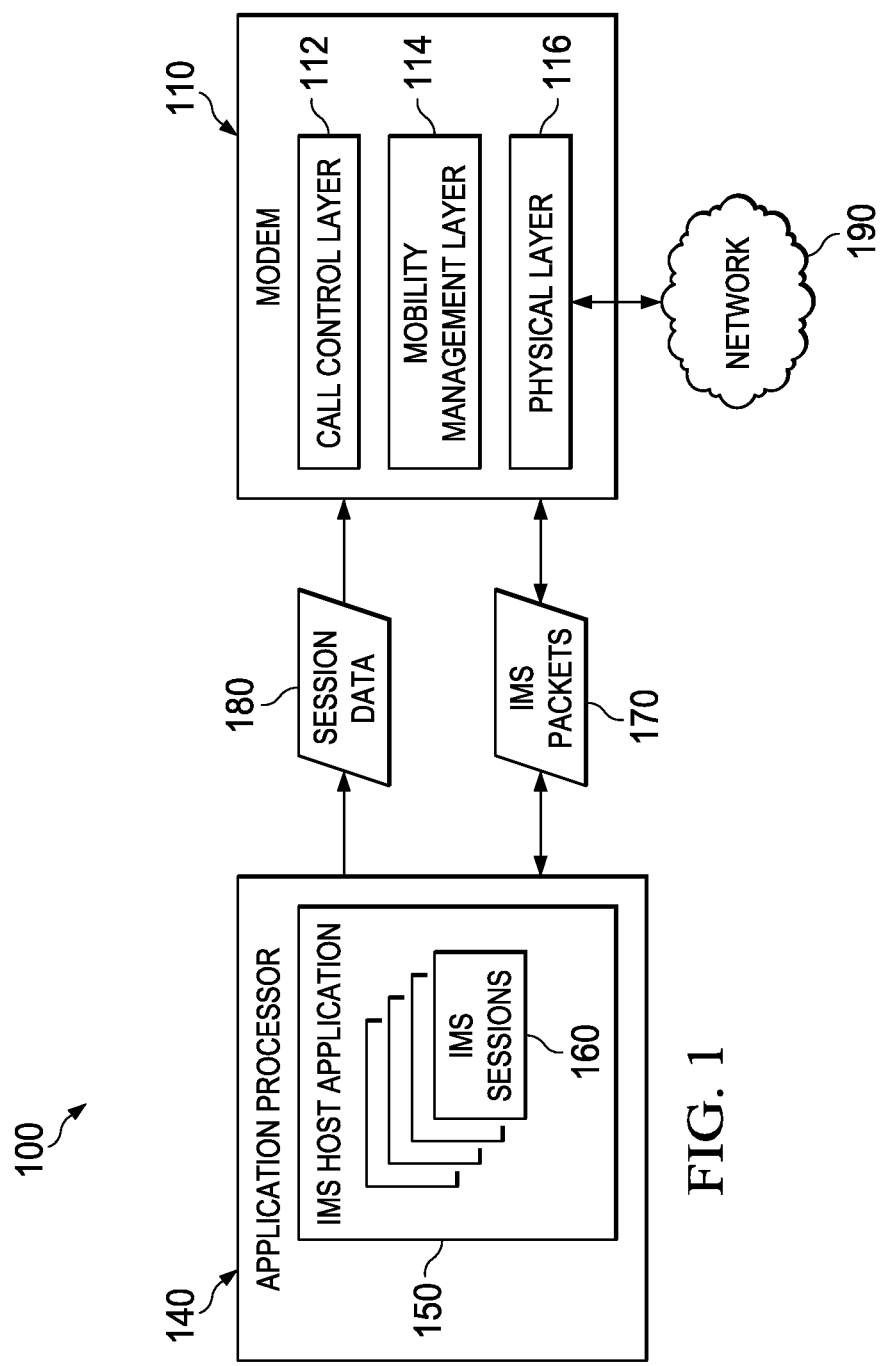
FIG. 1 is a block diagram of one embodiment of a mobile communication device.

The traditional mobile communication device architecture contemplates a modem in the mobile device that establishes and manages all IMS sessions for the device. The modem often includes an internal processor that executes an application that manages voice-only and video/voice calls. The various layers of the modem are free to gain access to whatever IMS session data is necessary to complete their tasks. In the event of a loss of PS network coverage, the network sends a handover command to the mobile device as it is about to leave the PS network coverage. The handover command directs the mobile device to hand over all IMS sessions to the CS network. The handover is carried out according to the SRVCC and vSRVCC procedures. One aspect of the SRVCC and vSRVCC procedures is to establish a call control channel for each IMS session. The call control channel carries the information necessary to continue an IMS session over the CS network. Absent the handover, a given IMS session is lost, otherwise known as a dropped call.

It is realized herein the traditional mobile communication device architecture did not contemplate PS to CS handovers for multiple IMS sessions established by an IMS host application executing external to the modem. A typical scenario presenting this shortcoming is an IMS host application executing on an application processor that communicates to the modem over a data bus. The IMS host application provides a voice-only calling capability, a video/voice calling capability or both. Certain IMS host applications, it is realized herein, are capable of establishing multiple IMS sessions for calls in various call states. For example, the IMS host application can have a video/voice call on hold, and a voice-only conference call active. The IMS host application provides a stream of IMS packets to the modem for transmission onto the network. It is further realized herein the modem is unaware of just how many IMS sessions exist via the IMS host application. The modem simply transmits and receives streams of IMS packets, unable to associate any one packet to a particular IMS session.

It is also realized herein, that in the event of a handover from the PS network to the CS network, the modem knows only to establish a single call control channel for continuing however many IMS sessions the IMS host application may have established. Consequently, it is realized herein the modem successfully hands over one IMS session and the rest are dropped. It is further realized herein, given little knowledge of the IMS sessions, the modem cannot identify how many or which of the multiple IMS sessions is actually handed over.

It is realized herein that IMS session data should be aligned between the IMS host application and the modem. This alignment can be achieved by introducing an interface for the IMS host application to submit respective IMS session data for each IMS session the IMS host application is managing. In certain embodiments, this command can be an attention command, often referred to as "AT commands." The command would carry the IMS session data as its argument. It is further realized herein the alignment of IMS session data allows the modem's various control layers to establish a sufficient number of call control channels to successfully handover and continue all IMS sessions managed by the IMS host application. The modem's various control layers include the mobility management (MM) layer and the call control (CC) layer, which are responsible for managing and maintaining the IMS sessions and associated connections. It is realized herein the IMS host application can update the modem with respective IMS session data as the IMS sessions progress through the various call states. When the network issues a handover command, the modem can employ the respective IMS session data to carry out an appropriate SRVCC procedure to hand over each IMS session from the PS network to the CS network.

FIG. 1 is a block diagram of one embodiment of a mobile communication device 100. Mobile communication device 100 includes an application processor 140 and a modem 110 communicably coupled to a network 190. Network 190 can be PS network or a CS network, depending on availability.

Application processor 140 executes an operating system that provides basic functionality for mobile communication device 100. There are a variety of operating systems that are commonly installed on mobile communication devices, including: Android®, Windows Phone® and iOS®, among many others. Application processor 140 also executes an IMS host application 150. IMS host application 150 is a program running within the operating system that can make and receive voice-only and video/voice calls through modem 110. IMS host application 150 communicates with modem 110 through the operating system. The voice-only and video/voice calls are established as IMS sessions 160. Each of IMS sessions 160 represents a single call and can be in variety of respective states, including a held call, conference call, active or inactive. Calls in conference are also referred to as multiparty calls.

Once IMS sessions 160 are established, IMS host application 150 gathers IMS packets 170 for all of IMS sessions 160 and passes them to modem 110 for transmission to network 190. Likewise, modem 110 passes received IMS packets back to IMS host application 150. IMS host application 150 also maintains session data 180 for each of IMS sessions 160. Session data includes: call state, call type, multiparty calls, an alignment identifier and any other information necessary for modem 110 to hand over IMS sessions 160 from a PS network to a CS network.

Modem 110 includes a CC layer 112, a MM layer 114 and a physical layer 116. Physical layer 116 is responsible for interfacing with network 190. Physical layer 116 transmits IMS packets 170 onto network 190 and receives IMS packets 170 from network 190. MM layer 114 is responsible for establishing and maintaining connections between mobile communication device 100 and network 190, including handing over IMS sessions 160 from the PS network to the CS network according to an SRVCC procedure. An SRVCC procedure can be either the SRVCC procedure or the vSRVCC procedure. One aspect of carrying out an SRVCC procedure is for CC layer 112 to establish a call control channel for each of IMS sessions 160. Establishing the call control channel requires session data 180 to distinguish among each of IMS sessions 160. This typically includes an alignment identifier for each of IMS sessions 160. The alignment identifier includes a compilation of data sufficient to form a unique identifier for each of IMS sessions 160. A common approach is to use a phone number as the alignment identifier.

If one of IMS sessions 160 is a conference call, each party to the call requires establishment of a respective call control channel to carry out an SRVCC procedure with respect to that party. Session data 180 also includes sufficient information to continue each of IMS sessions 160 as the appropriate call type and in the appropriate call state. The call state can be active, inactive or alerting. The alerting state generally refers to IMS sessions having a state of mobile originated session started or mobile terminated session started. The call type describes the IMS session as either a voice-only call or a video/voice call.

For IMS sessions originating in modem 110, sufficient session data is generally available to MM layer 114 and CC layer 112 for carrying out an SRVCC procedure. For IMS sessions 160, established outside modem 110, session data 180 is transmitted from application processor 140 to modem 110 for use in MM layer 114 and CC layer 112. As each of IMS sessions 160 progresses through various call states, IMS host application 150 initiates an alignment of session data 180 between IMS host application 150 and modem 110. In certain embodiments, this alignment includes IMS host application 150 executing a command to modem 110 that includes session data 180 as an argument. In certain embodiments this command is an AT command, otherwise part of a larger command interface to modem 110.

When network 190 determines mobile communication device 100 is going to lose access to the PS network, network 190 issues a handover command to mobile communication device 100. Physical layer 116 receives the handover command and passes the task on to MM layer 114 and CC layer 112. CC layer 112 then employs session data 180 to establish call control channels and carry out an SRVCC procedure to hand over each of IMS sessions 160 from the PS network to the CS network. MM layer 114 employs session data 180 to determine how many IMS sessions are actually handed over.

Figure 2:
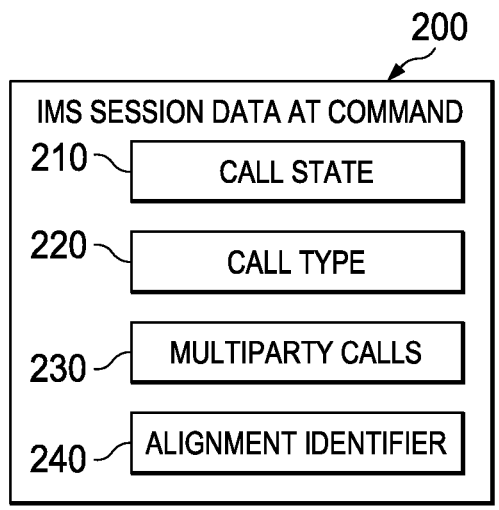
FIG. 2 is a block diagram of one embodiment of an IMS session data AT command.

FIG. 2 is a block diagram of one embodiment of an IMS session data AT command 200. IMS session data AT command 200 carries IMS session data, including: a call state 210, a call type 220, multiparty calls 230 and an alignment identifier 240.

An IMS session has a call state, such as call state 210, that is reflected in the call control channel established during the SRVCC procedure. The 3GPP standard defines many call states for the IMS session; however, typically only a subset are eligible call states for an IMS session to be handed over from a PS network to a CS network. The subset of IMS call states eligible for handover includes mobile originated session started, mobile terminated session started, session active and session inactive. These states include active calls, held calls, conference calls and alerting calls, among others.

Call type 220 distinguishes a voice-only IMS session from a video/voice IMS session. In certain embodiments, the vSRVCC procedure is unavailable for handing over a voice-only IMS session from the PS network to the CS network. The corollary to the limited employment of the vSRVCC procedure is that SRVCC procedure may be used for both video/voice IMS sessions and voice-only IMS sessions. In the event a video/voice IMS session is handed over via the SRVCC procedure, the voice aspects of the IMS session are handed over while the video aspects are lost. In other words, the IMS session will continue as a voice-only call.

Multiparty calls 230 carries additional information in the event an IMS session includes a conference call, or a "multiparty call." When a conference call is handed over according to SRVCC procedures, a call control channel must be established for each party to the IMS session. For example, to carry out the SRVCC procedure for a five party conference call, five call control channels are established. Multiparty calls 230 carries the additional information necessary to establish a call control channel for each party to the conference call.

Alignment identifier 240 is a unique identifier for associating the original IMS session on the PS network with the newly established call control channel and IMS session on the CS network. Alignment identifier 240 can be any compilation of data to distinguish one IMS session from another. For example, one embodiment uses a phone number as alignment identifier 240. Alternate embodiments could employ the phone number and call state. Yet other embodiments generate and employ new, unsolicited information regarding the IMS session.

Figure 3:
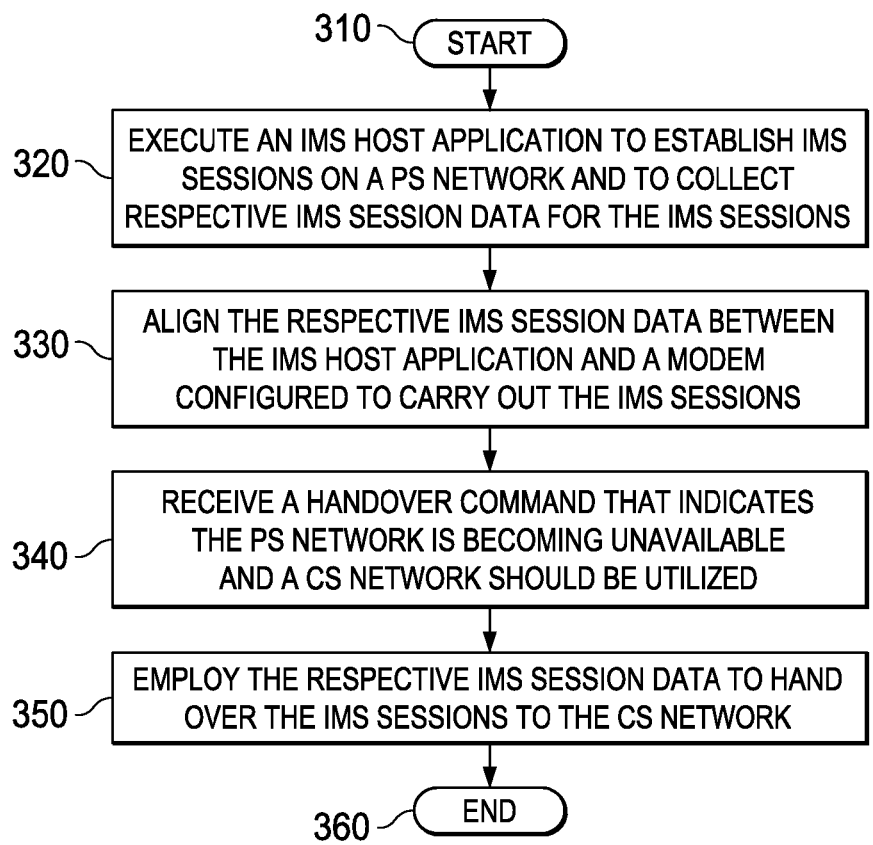
FIG. 3 is a flow diagram of one embodiment of a method of handing over IMS sessions from a PS network to a CS network.

FIG. 3 is a flow diagram of one embodiment of a method of handing over IMS sessions from a PS network to a CS network. The method begins in a start step 310. In an execution step 320 an IMS host application is executed to establish IMS sessions on a PS network and to collect respective IMS session data for the IMS sessions. The IMS sessions can include any combination of voice-only IMS sessions and video-voice IMS sessions.

The respective IMS session data is aligned between the IMS host application and a modem in an alignment step 330. Alignment can be had by a command from the IMS host application to the modem that carries the IMS session data. In certain embodiments this command is an AT command that contains the respective IMS session data as an argument.

The modem is responsible for carrying out the IMS sessions, which typically includes establishing and maintaining connections between the modem and the network, and transmitting and receiving IMS packets. In a receiving step 340, the modem receives a handover command from the PS network indicating the PS network is becoming unavailable to the modem, and the modem should handover any IMS sessions to a CS network. The handover is performed in a handover step 350, where the modem employs the respective IMS session data of each IMS session to handover the IMS sessions to the CS network. It certain embodiments, the handover is performed according to an SRVCC procedure, which may be either the SRVCC procedure or the vSRVCC procedure. The method ends in an end step 360.

Those skilled in the art to which this application relates will appreciate that other and further additions, deletions, substitutions and modifications may be made to the described embodiments.

What is claimed is:

1. A modem, comprising:
   a transceiver configured to communicate with a communications network and provide:
   a physical layer through which Internet protocol (IP) multimedia subsystem (IMS) packets for a plurality of ongoing IMS sessions are transmittable and receivable; and
   a control layer configured to gain access to respective IMS session data for said plurality of ongoing IMS sessions,
   wherein said respective IMS session data originating from a host IMS application is aligned between said host IMS application and said modem, and each of said ongoing IMS sessions is distinguishable from one another using a unique alignment identifier.

2. The modem recited in claim 1 wherein said control layer is further configured to establish a call control channel for each of said respective IMS sessions.

3. The modem recited in claim 1 wherein said control layer includes a call control (CC) layer configured to gain access to said respective IMS session data to establish call control channels.

4. The modem recited in claim 3 wherein said physical layer is communicably couplable to a packet-switched (PS) network over which said plurality of ongoing IMS sessions are established and onto which said IMS packets are transmittable and receivable.

5. The modem recited in claim 4 wherein said physical layer is communicably couplable to a circuit-switched (CS) network onto which said IMS packets are transmittable and receivable.

6. The modem recited in claim 5 wherein said physical layer is configured to receive a handover command from said PS network that indicates said plurality of ongoing IMS sessions should be handed over to said CS network.

7. The modem recited in claim 6 wherein said control layer is operable to gain access to said handover command and configured to initiate and carry out a single radio voice call continuity (SRVCC) procedure to complete a handover of said plurality of ongoing IMS sessions from said PS network to said CS network.

8. The modem recited in claim 7 wherein said control layer includes a mobility management (MM) layer and a call control (CC) layer that are configured to employ said respective IMS session data to carry out said SRVCC procedure and continue said plurality of IMS ongoing sessions over said CS network.

9. A method of handing over multiple ongoing Internet protocol (IP) multimedia subsystem (IMS) sessions from a packet-switched (PS) network to a circuit-switched (CS) network, comprising:
 executing an IMS host application to establish said multiple ongoing IMS sessions on said PS network and to collect respective IMS session data for said multiple ongoing IMS sessions;
 aligning said respective IMS session data for said multiple ongoing IMS sessions between said IMS host application and a modem configured to carry out said multiple ongoing IMS sessions, wherein each of said ongoing IMS sessions is distinguishable from one another using a unique alignment identifier; and
 employing said respective IMS session data in handing over said multiple ongoing IMS sessions to said CS network.

10. The method recited in claim 9 wherein said handing over includes carrying out a single radio voice call continuity (SRVCC) procedure.

11. The method recited in claim 10 wherein said handing over includes establishing a call control channel for each of said multiple ongoing IMS sessions.

12. The method recited in claim 9 further comprising receiving a handover command indicating said PS network is becoming unavailable and said CS network should be used.

13. The method recited in claim 9 wherein said aligning includes invoking a command having said respective IMS session data as an argument, said command originating at said host IMS application and destined for said modem.

14. The method recited in claim 13 wherein said command is an attention (AT) command.

15. The method recited in claim 9 wherein said multiple ongoing IMS sessions include video/voice IMS sessions.

16. A mobile communication device, comprising:
 an application processor configured to execute an Internet protocol (IP) multimedia subsystem (IMS) host application operable to establish multiple ongoing MS sessions and maintain respective IMS session data for said multiple ongoing IMS sessions; and
 a modem configured to carry out said multiple ongoing IMS sessions over a network and having:
  a physical layer through which IMS packets for said multiple ongoing IMS sessions are transmittable and receivable; and
  a control layer including a mobility management (MM) layer and a call control (CC) layer, said control layer configured to gain access to said respective IMS session data for said multiple ongoing IMS sessions,
 wherein said respective IMS session data originating from a host IMS application is aligned between the host IMS application and said modem, and each of said ongoing IMS sessions is distinguishable from one another using a unique alignment identifier.

17. The mobile communication device recited in claim 16 wherein said network is a packet-switched (PS) network configured to submit a handover command to said modem directing said modem to hand over said multiple ongoing IMS sessions to a circuit-switched (CS) network.

18. The mobile communication device recited in claim 17 wherein said respective IMS session data includes a count of active channels among said multiple ongoing IMS sessions and said MM layer is configured to gain access to said count.

19. The mobile communication device recited in claim 17 wherein said multiple ongoing IMS sessions include video/voice IMS sessions.

20. The mobile communication device recited in claim 19 wherein said modem is configured to employ said respective IMS session data in carrying out a video single radio call continuity (vSRVCC) procedure to hand over said multiple ongoing IMS sessions to said CS network.

21. The mobile communication device recited in claim 17 wherein said multiple ongoing IMS sessions include voice only IMS sessions.

22. The mobile communication device recited in claim 20 wherein said modem is configured to employ said respective IMS session data in carrying out a single radio call continuity (SRVCC) procedure to hand over said multiple ongoing IMS sessions to said CS network.

23. The mobile communication device recited in claim 17 wherein said respective IMS session data includes:
 a call state;
 a call type;
 multiparty calls; and
 an alignment identifier.

24. The mobile communication device recited in claim 23 wherein said CC layer is operable to employ said respective IMS session data to maintain said multiple ongoing IMS sessions over said CS network.

\* \* \* \* \*